Nov. 4, 1941.  W. C. PIPER  2,261,589

SKINNING MACHINE ATTACHMENT

Filed June 2, 1939

ATTEST—

Hm. C. Meiser

Walter Carl Piper
INVENTOR

BY Ferry W. Johns.
ATTORNEY

Patented Nov. 4, 1941

2,261,589

UNITED STATES PATENT OFFICE 2,261,589

SKINNING MACHINE ATTACHMENT

Walter Carl Piper, South St. Paul, Minn., assignor to Industrial Patents Corporation, Chicago, Ill., a corporation of Delaware Application June 2, 1939, Serial No. 277,060

4 Claims. (Cl. 146—130)

This invention relates to an improved skinning method and means therefor.

In most localities, the retail trade demands that all or a major portion of the skin be removed from the flank surface of hams. To so serve the housewife without a loss of profit to the producer, it is necessary that a minimum of fat be removed with the skin. Also, to remove the skin and at the same time maintain a product pleasing in appearance, it is desired that the line of severance between the skin removed and the skin retained be relatively straight and even and that the plane of severance between the removed skin and retained fat be relatively smooth.

It is the object of the present invention to provide an improved method and means for accomplishing the aforementioned purposes in a commercially practicable and profitable manner.

The device of the present invention is exemplified in the several figures shown in the attached drawing in which like figures are used to designate similar elements.

Figure 1:
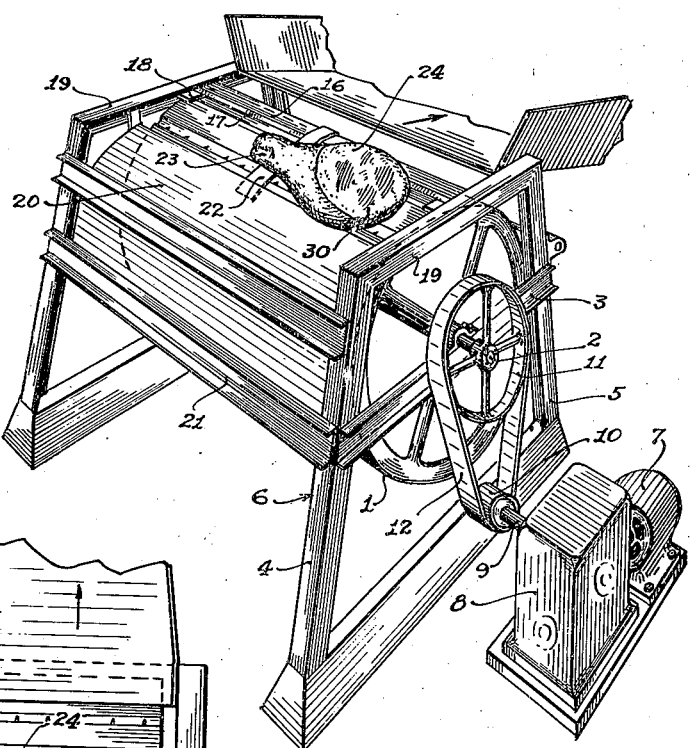
Figure 1 is a perspective view of the device in which there is shown a ham being skinned in accordance with the present invention.
Figure 3:
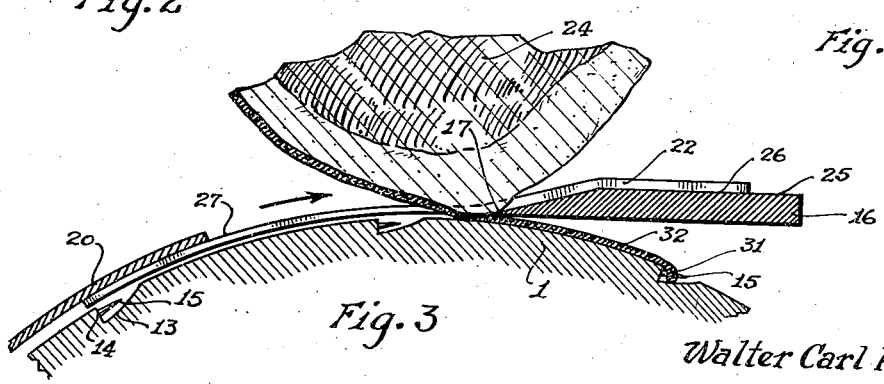
Figure 3 is an enlarged detail taken substantially on line 3—3 of Figure 2, showing a ham being skinned.

In the device, drum 1 is pinioned or otherwise rigidly secured to shaft 2 journaled within suitable bearings, not shown, mounted upon cross members 3. Cross members 3 are rigidly mounted between standards 4 and 5 of framework 6. Drum 1, as viewed in Figures 1 and 3, is rotated in a clockwise direction by power transmitted from motor 7 through the medium of gear box 8, shaft 9, pulleys 10 and 11 and belt 12.

The peripheral surface of drum 1 is provided with a series of spaced longitudinal recesses 13, each having a radial wall 14 facing in the direction of rotation of the drum and to which is rigidly mounted grab pins 15.

Knife blade 16 provided with cutting edge 17, is rigidly affixed longitudinally of, in spaced relation with, and in close proximity to the peripheral surface of drum 1. The space between cutting edge 17 and the surface of drum 1 is fixed at the narrowest possible limit to allow complete removal of the skin without removal of an excess of the fat. Knife 16 is fixedly secured within the machine as by brackets 18 which in turn are rigidly secured to cross members 19 of framework 6. Guard 20 of relatively rigid sheet metal material is rigidly affixed to cross member 21 of framework 6.

The drum and knife elements hereinbefore described may be substantially of the type illustrated in the patent to Morrison, No. 1,790,592, issued January 27, 1931, entitled Machine for removing skins from pork bellies, and no claim to these elements per se is made herein.

The device of the present invention resides in an attachment which may be employed with the Morrison type machine and comprises member 22 for supporting away from and out of contact with knife 16, the shank end 23 of ham 24 during skinning of the ham. Member 22 comprises an elongated, relatively rigid metal strip mounted transversely of the axis of, circumferentially in spaced relation with, and in close proximity to the peripheral surface of drum 1. Described another way, member 22 may be said to be extended forwardly of the cutting edge 17 in substantially the same plane as the cutting edge 17 and having an edge 28 substantially at a right angle to cutting edge 17.

Figure 2:
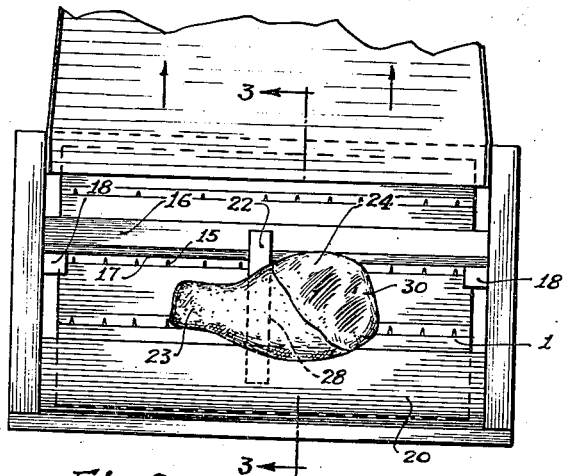
Figure 2 is a plan view of Figure 1, the means for driving the device being removed.
Figure 4:
Figure 4 is a section through the supporting member showing a modified form thereof.

As viewed in Figure 3, member 22 at one of its ends is bent to conform to the upper surface 25 of knife 16 and at that end is welded or otherwise rigidly secured, as at 26, to the surface 25 of knife 16. Member 22 at its opposite end 27 may be welded or otherwise rigidly secured to the undersurface of guard 20. In the form of the device shown in Figures 1, 2 and 3, the upper supporting surface of member 22 comprises a single plane throughout its width. In the modified form of the device shown in Figure 4, member 22 is provided at one of its longitudinal edges 28, preferably the edge adjacent the supported ham 24, with upwardly extended cutting edge 29. Cutting edge 29, although not necessary to the successful operation of the device, provides positive means for cutting the skin circumferentially of the ham.

In practicing the method of the present invention, an operator, not shown, places ham 24 on the machine substantially in the manner shown in Figure 1, that is, the shank end 23 supported against member 22 and out of contact with the cutting edge of knife 16, and butt end 30 pressed firmly against the rotating surface of drum 1. As will be seen, the series of grab pins 15 next to approach ham 24 will pierce, as at 31, the skin 32 of butt end 30, and carry it against the action of knife 16. It further will be seen that since shank end 23 is supported out of contact with knife blade 16, skin 32 will be severed circumferentially of ham 24 at approximately its line 33 of rotation against edge 28 of member 22.

Figure 5:
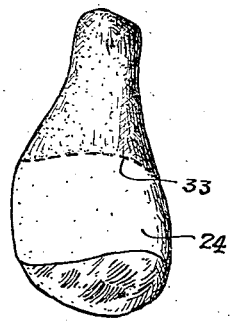
Figure 5 shows a ham skinned in accordance with the present invention.

It also will be seen that due to the relative toughness of skin 32 and the flexibility of its adjacent fat layer, skin 32 will readily flatten its line of movement against the cutting edge of knife 16 and due to the close setting of knife 16 relative to the surface of drum 1, only the skin 32 with a fair minimum of fat will be removed from the ham. A ham skinned in accordance with the present invention is shown in Figure 5.

I claim:

1. A ham skinning device including in combination with a movable surface provided with gripping means and a cutter extended transversely of and in close spaced relationship with the movable surface, means for supporting one end of the ham out of contact with the cutter comprising an elongated rigid member extended forwardly of the cutter above the movable surface and parallel to the path of movement of the movable surface, the member at one of its edges extended parallel to the path of movement of the movable surface being provided with an upwardly extending cutting edge.

2. In a ham skinning device including a rotatable drum provided with gripping means and a fixed cutter mounted transversely of and in close proximity to the peripheral surface of the drum, means for supporting the small end of the ham out of contact with the cutter comprising a rigid elongated member extended forwardly of the cutter and above and circumferentially of the drum surface, the member adjacent one of its side edges being provided with an upwardly extending cutting edge.

3. In a ham skinning device including in combination a movable surface, gripping means, and a cutter having a cutting edge mounted transversely of and in close spaced relationship with the movable surface, means for preventing contact of the skin on one end of a ham with said cutting edge, said means having a longitudinal severing edge forward of the cutting edge, in close proximity to and substantially overlying said movable surface in order to sever the removed skin from the skin retained on the ham.

4. A ham skinning device including a rotatable drum provided with gripping means and a cutter having a cutting edge mounted parallel to the axis of and in close proximity to the peripheral surface of the drum, means for preventing contact of the skin on one end of a ham with said cutting edge, said means having a severing edge forward of said cutting edge mounted transversely of the axis of, in close proximity to, and substantially overlying said rotatable drum in order to sever the removed skin from the skin retained on the ham.

WALTER CARL PIPER.